H. J. H. KING.
Pressure Gage.
No. 96,705.                     Patented Nov. 9, 1869.
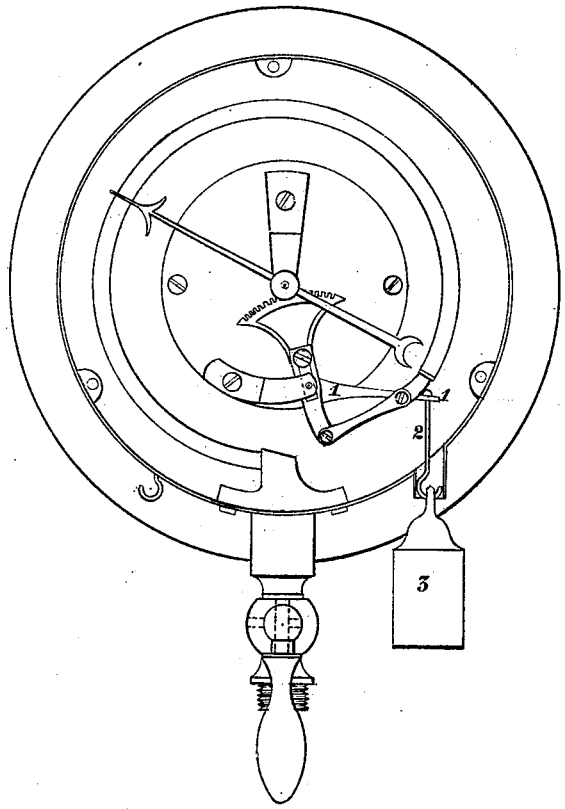
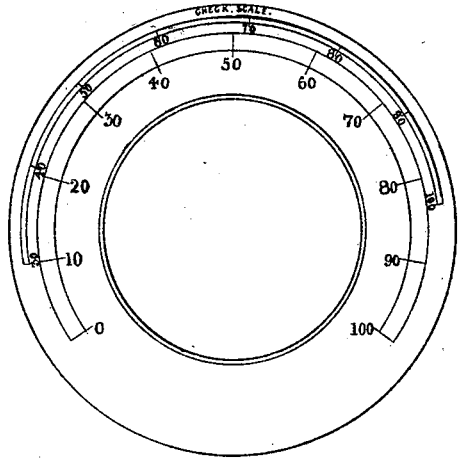

United States Patent Office.

HENRY JAMES HOGG KING, OF GLASGOW, GREAT BRITAIN.

Letters Patent No. 96,705, dated November 9, 1869.

---

IMPROVEMENT IN PRESSURE-GAUGES.

---

The Schedule referred to in these Letters Patent and making part of the same.

---

*To all whom it may concern:*

Be it known that I, HENRY JAMES HOGG KING, of Glasgow, in the county of Lanark, Kingdom of Great Britain and Ireland, have invented a new and useful Improvement in Pressure-Gauges; and I do hereby declare the following to be a full, clear, and exact description of the same, reference being had to the accompanying drawing, and to the reference numerals marked thereon.

My invention has for its object to provide appliances, in connection with a pressure-gauge, to admit of its accuracy being checked at any time, so that the user can, whenever he likes, assure himself of the perfect reliability of his gauge, or otherwise ascertain positively that its action has become impaired.

The improvement is applicable to any pressure-gauge in which a spring or combination of springs is employed for resisting the pressure, and indicating the amount of such pressure by the degree to which it is compressed, or extended, or changed in form. It is applicable, for example, to gauges like the Bourdon gauge, in which the pressure, acting within or without an elastic vessel, indicates its amount by the change of form it produces.

My improvement consists in providing for checking the gauge at any time, by originally marking a secondary or checking-scale on the dial, in addition to the ordinary scale, and by fitting a hook or ring in connection with the indicating-mechanism, on which a predetermined weight is to be hung whenever it is wished to check the gauge.

Provision is also made for putting the interior of the gauge in communication with the atmosphere, in order to ascertain whether the elastic parts have received any permanent set; and this is done by drilling suitable additional holes in the plug and shell of the stop-cock, by which the fluid to be gauged is admitted to the gauge.

And, in order to enable others skilled in the art to make and use my invention, I now proceed to describe its construction and operation.

In the accompanying drawing, my improvement is represented as applied to a Bourdon gauge, the figure being an elevation of such a gauge, with the dial removed.

I fix a lever, 1, to the toothed quadrant, which gears with the pinion of the index or pointer; and to the end of the lever 1, I joint a hooked link, 2, on which a weight, 3, can be hung.

The hooked link 2 projects down through a tube, fitted to the gauge-casing, and this tube may be closed by a cap when the checking-weight 3 is not being used.

The application of the weight will obviously cause the indication of any internal pressure to differ from that which is given without the weight; and the secondary or checking-scale on the dial is marked to correspond with the differences produced by the weight when the gauge is in order. Then, if the gauge should get out of order, the application of the weight will cause the index to point to a part of the checking-scale not corresponding with the part it points to on the ordinary scale.

The dial, with the ordinary and "check" scales upon it, is shown separately below the gauge.

A small hole is drilled through the side 4 of the stop-cock of the gauge, and a hole is also drilled through the side of the plug, at right angles to the ordinary "way" through the plug, thus making the cock into a three-way one, which may be set in a position to admit the atmosphere into the interior of the gauge, when wished.

When the atmosphere is so admitted, the index ought to point to zero on the ordinary scale; and if it should not do so, it would follow that the elastic parts had acquired a permanent set, such as to render the gauge inaccurate.

What I claim as my invention, and desire to secure by Letters Patent, is—

1. The application to spring pressure-gauges of a hook, or equivalent device, connected with the spring, upon which a given weight may be hung, for testing, at any time, the accuracy of the spring, substantially as described.

2. In combination with a testing-device, as set forth, the application of a three-way cock to the entrance-tube of the pressure-gauge, arranged to open the same to the atmosphere, as and for the purpose herein described.

In testimony whereof, I have signed my name to this specification, in the presence of two subscribing witnesses.

H. J. H. KING.

Witnesses:
   EDMUND HUNT, *Glasgow*,
   ALEXR. TEMPLETON, *Glasgow*.